United States Patent
Sigler et al.

(10) Patent No.: US 9,682,439 B2
(45) Date of Patent: *Jun. 20, 2017

(54) WELDING ELECTRODE WITH CONTOURED FACE

(71) Applicant: GM Global Technology Operations LLC, Detroit, MI (US)

(72) Inventors: David R. Sigler, Shelby Township, MI (US); Michael J. Karagoulis, Okemos, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 708 days.

This patent is subject to a terminal disclaimer.

(21) Appl. No.: 13/777,345

(22) Filed: Feb. 26, 2013

(65) Prior Publication Data

US 2013/0168367 A1 Jul. 4, 2013

Related U.S. Application Data

(63) Continuation of application No. 11/536,001, filed on Sep. 28, 2006, now Pat. No. 8,436,269.

(51) Int. Cl.
*B23K 9/24* (2006.01)
*B23K 11/30* (2006.01)
(Continued)

(52) U.S. Cl.
CPC .......... *B23K 11/3009* (2013.01); *B23B 5/166* (2013.01); *B23K 11/3063* (2013.01);
(Continued)

(58) Field of Classification Search
CPC . B23K 11/3009; B23K 11/3063; B23K 11/14;
B23K 11/31; B23K 11/002; B23K 11/3018; B23K 11/11; B23K 11/115; B23K 35/0205; B23K 3/0471; B23B 5/166; B23B 27/24; Y10T 82/16442; Y10T 407/19; Y10T 83/9372; B21H 1/04
USPC ...... 219/119, 86.33, 117.1, 120, 78.01, 86.1, 219/86.9, 86.8, 86.7, 86.25, 85.16, 92, 93, 219/94; 72/71, 703
See application file for complete search history.

(56) References Cited

U.S. PATENT DOCUMENTS 1,303,919 A * 5/1919 Lachman .................. 219/119
2,379,187 A * 6/1945 Richards .................. 219/119
(Continued)

OTHER PUBLICATIONS

U.S. Appl. No. 12/356,613—Notice of Allowance mailed May 22, 2012 (9 pages).
(Continued)

*Primary Examiner* — Quang D Thanh
*Assistant Examiner* — Hemant Mathew
(74) *Attorney, Agent, or Firm* — Reising Ethington P.C.

(57) ABSTRACT

A welding electrode for resistance spot welding includes a weld face comprising rings of ridges that project outwardly from a base surface of the weld face. The rings of ridges are positioned on the weld face to contact and impress into a sheet metal workpiece surface during resistance spot welding. If the welding electrode is used during resistance spot welding of light metal alloy workpieces, such as those of aluminum alloy or magnesium alloy, the rings of ridges on the weld face can contribute to improved welding performance.

10 Claims, 1 Drawing Sheet

(51) Int. Cl.
 H05B 3/03 (2006.01)
 B23K 9/28 (2006.01)
 B23K 11/00 (2006.01)
 B23B 5/16 (2006.01)
 B23K 35/02 (2006.01)
 B23K 11/14 (2006.01)

(52) U.S. Cl.
 CPC .......... *B23K 35/0205* (2013.01); *B23K 11/14* (2013.01); *Y10T 82/16442* (2015.01); *Y10T 83/9372* (2015.04); *Y10T 407/19* (2015.01)

(56) References Cited

U.S. PATENT DOCUMENTS

| | | | |
|---|---|---|---|
| 2,641,670 A * | 6/1953 | Graves, Jr. | 200/264 |
| 3,689,731 A | 9/1972 | Miller | |
| 3,820,437 A * | 6/1974 | Dyer et al. | 408/139 |
| 4,588,870 A | 5/1986 | Nadkarni et al. | |
| 4,591,687 A * | 5/1986 | Urech | 219/93 |
| 4,610,153 A * | 9/1986 | Nedorezov | 72/112 |
| 5,015,816 A * | 5/1991 | Bush et al. | 219/119 |
| 5,155,320 A * | 10/1992 | Simmons | 219/120 |
| 5,304,769 A * | 4/1994 | Ikegami et al. | 219/119 |
| 5,844,194 A | 12/1998 | Kuwabara et al. | |
| 5,951,888 A | 9/1999 | Oakley | |
| 6,037,559 A | 3/2000 | Okabe et al. | |
| 6,322,296 B1 | 11/2001 | Wetli et al. | |
| 6,861,609 B2 * | 3/2005 | Sigler | 219/117.1 |
| 7,249,482 B2 | 7/2007 | Chen | |
| 8,222,560 B2 | 7/2012 | Sigler et al. | |
| 8,274,010 B2 | 9/2012 | Sigler et al. | |
| 8,350,179 B2 | 1/2013 | Schroth et al. | |
| 8,436,269 B2 | 5/2013 | Sigler et al. | |
| 8,481,170 B2 | 7/2013 | Sigler et al. | |
| 8,525,066 B2 | 9/2013 | Sigler et al. | |
| 2003/0116539 A1 | 6/2003 | Wile et al. | |
| 2005/0211677 A1* | 9/2005 | Chen | 219/117.1 |
| 2006/0081563 A1 | 4/2006 | Ueda et al. | |
| 2009/0255908 A1 | 10/2009 | Sigler et al. | |
| 2010/0258536 A1 | 10/2010 | Sigler et al. | |
| 2013/0008295 A1 | 1/2013 | Sigler et al. | |
| 2013/0015164 A1 | 1/2013 | Sigler et al. | |
| 2013/0048613 A1 | 2/2013 | Sigler et al. | |

OTHER PUBLICATIONS

U.S. Appl. No. 12/235,613—Non-final Office Action mailed Aug. 17, 2011 (11 pages).
U.S. Appl. No. 12/821,435—Final Office Action mailed on Jun. 19, 2013 (13 pages).
U.S. Appl. No. 12/821,435—Non-final Office Action mailed on May 22, 2012 (9 pages).
U.S. Appl. No. 13/617,166—Non-final Office Action mailed on Jul. 1, 2013 (6 pages).
U.S. Appl. No. 12/251,635—Advisory Action mailed on Sep. 9, 2013 (3 pages).
U.S. Appl. No. 12/251,635—Final Office Action mailed on Jun. 6, 2013 (14 pages).
U.S. Appl. No. 12/251,635—Non-final Office Action mailed on Dec. 19, 2012 (13 pages).
U.S. Appl. No. 12/251,635—Advisory Action mailed on Jun. 1, 2012 (3 pages).
U.S. Appl. No. 12/251,635—Final Office Action mailed on Mar. 13, 2012 (11 pages).
U.S. Appl. No. 12/251,635—Non-final Office Action mailed on Sep. 16, 2011 (10 pages).
U.S. Appl. No. 13/841,397—Non-provisional patent application, Sigler et al., filed Mar. 15, 2013 (22 pages).

* cited by examiner

WELDING ELECTRODE WITH CONTOURED FACE

This application is a continuation of Ser. No. 11/536,001, filed on Sep. 28, 2006, now U.S. Patent Application Publication No. 2008/0078749.

TECHNICAL FIELD

This invention pertains to welding electrodes for electrical resistance welding. More specifically this invention pertains to the formation of concentric geometric features on the welding face of the electrode for improved electrical contact with the workpiece.

BACKGROUND

Current automotive vehicle manufacturing operations include, for example, the joining of two sheet metal layers by spot welding. Vehicle body panels such as doors, hoods, deck lids and liftgates are often assembled by joining inner and outer panels stamped from sheet metal of suitable metal alloys. Ferrous or aluminum alloys are often used. The thickness of each sheet metal layer may vary from less than one millimeter to more than four millimeters. Electrical resistance spot welding is often used to join such inner and outer panels or other metal parts.

In the case of sheet metal body components, flats or flanges of two or three components are placed together and then a series of spot welds penetrating from the top sheet layer into the bottom layer are made to securely attach the panels. Welding practices have been developed for such spot welding operations. Good welding practices are particularly critical in joining aluminum sheet alloys because of the high electrical and thermal conductivity of the material and the omnipresent oxide coating on the surface. Similar welding challenges arise in the welding of other light metal workpieces such as parts made of magnesium alloys. The spot welding operation is accomplished by assembling the parts in a suitable fixture and pressing welding electrodes against opposite sides of the overlying or touching parts at the intended weld location. The welding electrodes usually provide both clamping force and current commutation for the weld.

Copper or copper alloy welding electrodes are often used in welding aluminum alloy workpieces. U.S. Pat. No. 6,861,609, titled Welding Electrode for Aluminum Sheets and assigned to the assignee of this invention, illustrates some such welding electrodes.

As illustrated in the '609 patent, the electrodes are often round cylinders with a welding face at one end shaped to engage the workpieces. The welding electrodes are part of a welding apparatus including a welding head or gun that can be moved and actuated to press two aligned and opposing electrodes against the assembled workpieces. The apparatus then delivers a momentary welding current to the electrodes to affect the weld. Workpiece metal layers between the electrodes are momentarily melted by electrical resistance heating to form a weld nugget joining the layers. The clamping force, the value of the welding current (often single phase alternating current, 60 Hz, or rectified direct current) and current duration (several cycles of the 60 cycle current) are also specified for the electrodes to be used and the welding task.

In vehicle manufacturing or other industrial process, each welding gun is typically used to make a rapid succession of welds, for example, around the periphery of two or more overlying panels. The high electrical and thermal conductivity in combination with the insulating nature of the naturally-formed surface oxides of aluminum alloys (or magnesium alloys) makes them difficult to weld using spot welding practices previously developed for steel alloys. In the case of light metal alloys, the spot welding process is sensitive to a large number of variables beyond the normal welding parameters of electrode configuration, electrode force, weld time, and weld current. These other variables include sheet surface oxidation, sheet surface cleanliness, sheet surface topography as well as process variations such as alignment of the electrodes to the sheet, location of electrodes relative to the sheet edge and part radius, metal fit up, gun stiffness, alignment of electrodes on the gun, electrode surface roughness, and wear of the electrode surface.

The welding faces of some electrodes are roughened by blasting with small steel or sand particles or abrasion with a coarse abrasive paper as illustrated in the '609 patent. The roughened surface is characterized by randomly distributed craters with peak to valley dimensions, for example, in the range of 5 to 30 micrometers and with substantially the same range of peak to peak spacing. This texture permits the electrode face to penetrate an oxide film on the workpiece surface to reduce electrode resistance (and overheating) at the contact surface of the electrode and part. But, whether textured or not, the tips or welding faces of the electrodes may be altered by erosion or by adhesion and buildup of workpiece material after several welds. Welding operations must then temporarily cease while the electrode faces are cleaned, or re-shaped, or re-dressed. The redressing of grit blasted electrode faces, for example, can require many tens of seconds of off-line processing.

There is a need to provide a resistance welding electrode with a contoured welding face that improves electrical contact with a workpiece surface and the reliability of resistance welding, and decreases the time required for re-dressing of the welding face during welding operations. Such an electrode would be useful in many welding applications and would be particularly useful in welding light metal alloy workpieces with their oxide surface films.

SUMMARY OF THE DISCLOSURE

This invention is applicable to electrodes or electrode caps or welding face surfaces especially for electrical resistance welding. Such electrode members often have round cylindrical bodies for easy securing in the electrode holder of a welding gun. An end of the electrode may be tapered from the diameter of the body to form a welding face. The welding face of the electrode may be machined so that the welding surface comprises concentric circular geometric features (ridges or grooves) instead of the random roughened surface achieved by grit blasting. Suitably, a pattern of concentric circular ridges or grooves starts at the center of the welding face and extends radially outwardly over the face of the electrode. The circular contours may extend from the welding face onto a tapered portion of the electrode because a tapered portion of the electrode may be brought into engagement with a part to be welded.

The concentric ridges or grooves are formed, respectively, to have circular surfaces projecting outwardly from the face of the electrode or inwardly into the face of the electrode so that these formed surfaces engage and possibly penetrate the surface layer or film of a workpiece. Each (or some) of the concentric ridges or grooves may be separated from their radially-spaced neighbors by a flat ring-shaped surface in the face of the electrode. By way of example, the circular ridges or grooves are suitably formed to have a peak-to-base height in the range of about 20 μm to 200 μm with a peak-to-peak or base-to-base spacing (depending on the profile of the ridges or grooves) of 80 μm to 1500 μm. This circularly contoured welding face pattern is easily formed on new electrodes.

Thus, a single-step process is provided that simultaneously provides the benefits of both electrode dressing, i.e., electrode reshaping, good alignment, electrode surface cleanliness, etc., with the benefits of a texturing process, i.e., improved mechanical stability, low contact resistance, and reduced external expulsion. This may be achieved by preparing (for example, machining) electrode dressing blades to cut or otherwise produce a circular contoured surface on the welding face (at least) of the electrode tip. This circular pattern is achieved by putting a series of fine grooves or ridges into the face of a dressing blade. For example, the circular grooves may have cross-sections that are semi-circular or saw-tooth (triangular) or sinusoidal in configuration. During electrode dressing, these grooves/ridges cut and produce corresponding ridges or grooves on the dressed surfaces of the electrode. As an example, grooves or channels can be machined into a tool steel blade using EDM machining.

The concentric circular ridge or groove design for the electrode cap provides improved welding performance of the electrode. It is also a textured pattern that can be restored very rapidly to the electrode face as it is re-dressed for continued welding operations.

Other objects and advantages of the electrodes will become apparent from a detailed description of some exemplary preferred embodiments.

DESCRIPTION OF PREFERRED EMBODIMENTS

A welding electrode cap (or welding face) design is provided that is useful for forming spot welds in metal workpieces. The welding electrode cap is useful in spot welding operations generally, and it offers advantages for welding light metal workpieces such as aluminum alloy and magnesium alloy sheet materials. These materials often have an oxide film on surfaces contacted by the aligned and opposing electrodes and it is preferred that the electrode faces be shaped to engage and pierce the oxide film during welding.

In the manufacture of car doors, deck lids, liftgates, and the like, for example, it is often the practice to form these parts of complementary inner and outer sheet metal panels. The panels are of complex curvature for overall design effect and to contain any necessary electrical wiring and/or hardware between them. The formed panels usually have flanges at their peripheral edges for joining. An inner panel is placed against an outer panel and the assembled workpieces positioned for the formation of a series of progressively formed electrical resistance spot welds in a bonding pattern along their flanges. In one type of welding operation, the assembled panels might be moved and positioned between the welding arms of a stationary pedestal welding machine. In another type of welding operation, the assembled panels might be held in a fixed position and a robot progressively moves a welding gun around the periphery of the workpieces to sequentially form the welds.

Figure 1:
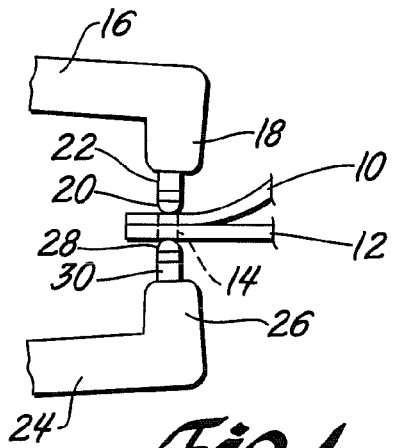
FIG. 1 is a schematic representation of aligned and opposing welding electrodes engaging assembled sheet metal panels for a resistance welding operation.

FIG. 1 illustrates a welding operation in which a spot weld is to be formed at a welding site 14 (shown as a dashed line weld nugget to be formed) in two juxtaposed aluminum alloy panels 10, 12 (only the overlapping edges of panels 10 and 12 are shown for simplification of the illustration). An upper welding gun arm 16 has an electrode holder 18 that holds welding electrode 20 in shank 22. The welding electrode is often water-cooled by means not illustrated. Welding gun arm 16 is part of a fixed welding apparatus or robot-carried welding apparatus, not shown. A lower welding arm 24 is also carried on the welding apparatus. Lower welding arm 24 has an electrode holder 26 that holds welding electrode 28 in shank 30.

Welding electrode 20 carried by the upper welding arm 16 is shown in spot weld forming engagement with the outer (upper in FIG. 1) surface of panel 10 and welding electrode 28 carried by lower welding arm 24 is shown engaging the outer (lower) surface of panel 12. In a spot welding operation, electrical current of suitable current value and duration is passed between the tips of opposing and aligned electrodes 20, 28 through the overlying panels 10, 12 at weld site 14. The electrodes 20, 28 are pressed together, suitably in a predetermined pressure schedule, to press the panels 10, 12 together at the weld site 14 and to obtain a suitable preprogrammed momentary current flow for resistance heating of the metal at the weld site 14. Metal in the current path is momentarily melted. The welding current is stopped; the molten metal rapidly loses heat to the water-cooled electrodes and the surrounding panel material and solidifies as a weld nugget joining panels 10, 12 at weld site 14. The opposing electrodes 20, 28 are then withdrawn.

This welding sequence is usually completed in a matter of a second or so. The panels or electrodes are moved to a nearby weld site and the process is repeated until a suitable predetermined number of spot welds are formed to secure panels 10 and 12. Then another workpiece assembly is brought into proximity of the welding apparatus and a new sequence of welds formed. As will be described, the faces of the electrodes play a role in the forming of each weld and in the efficiency of the ongoing welding process.

The welding faces of the electrodes gradually become eroded and/or accumulate unwanted deposits. The welding apparatus is then usually temporarily withdrawn from "on-line" operation so that the faces of the electrodes can be repaired or an electrode replaced.

In this example, electrode 28 is identical to electrode 20, but the electrodes are not necessarily the same shape.

Figure 2:
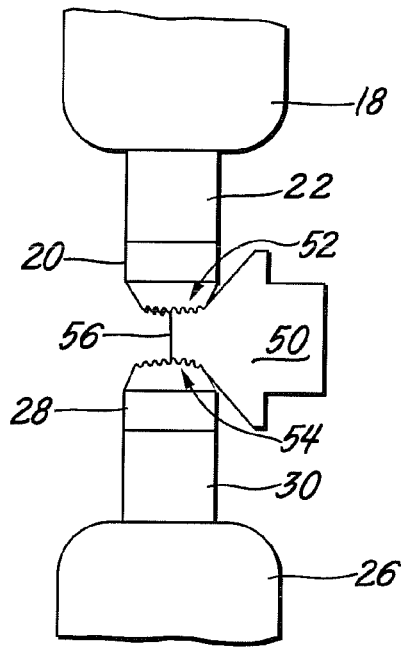
FIG. 2 is a schematic representation of the electrodes of FIG. 1 positioned to have their welding faces re-dressed by a cutter blade shaped for cutting concentric round ridges in the faces of the tools.
Figure 3:
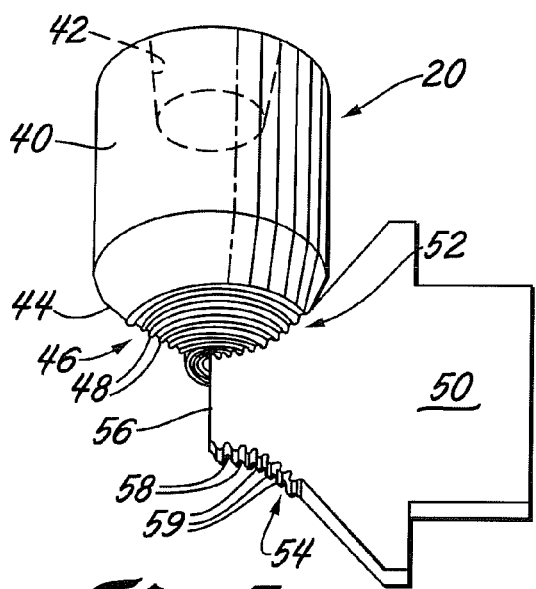
FIG. 3 is an enlarged view of a cutter blade positioned under a welding electrode for the formation of concentric round ridges in the face of the tool.

Electrode 20 is further illustrated in FIGS. 2, 3, 4, and 6. Referring to FIG. 3, electrode 20 has a round body 40 with a hollow receptacle 42 adapted to receive a shank 22 for insertion into holder 18 of a welding arm 16. And electrode 20 has a tapered transition section 44 with a spherically crowned welding face 46. A series of concentric circular ridges 48 are formed in and constitute the welding face surface 46 of welding electrode 20. The pattern of circular ridges 48 (or in another embodiment, grooves) may extend onto the tapered surface 44 of electrode 20, but this is not illustrated in FIG. 3.

Figure 4:
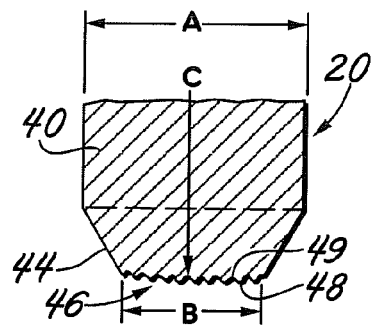
FIG. 4 is an enlarged view of an electrode with a tapered conical tip and a machined crowned welding face with a ridge-containing surface.

FIG. 4 illustrates a portion of the body 40 and tapered end portion 44 of electrode 20 in cross-section. Referring to FIG. 4, and by way of example, the diameter (dimension A in FIG. 4) of electrode body 40 is often about 12.5 mm to 22.2 mm. The diameter of the electrode body is usually not critical but it must be strong enough to withstand the 700 to 1500 pound (or so) weld force applied for welding a variety of aluminum gauges, and it must be at least the diameter of the welding face 46.

The planar diameter (dimension B in FIG. 4) of the spherically crowned or domed welding face 46 of electrode 20 is, for example, between about 6 and 12 mm. Welding face 46 may preferably be rounded or crowned with an exemplary radius (dimension C in FIG. 4) of about 25.4 mm.

A plurality of round concentric ridges 48 (FIGS. 3, 4, and 6) are formed in the spherically crowned welding face 46 of electrode 20. These ringed-ridges 48 extend radially outward from the center of weld face 46, the longitudinal axis (axis 47 in FIG. 6) of round cylindrical electrode 20. In a preferred embodiment, each contoured ridge 48 is nearly semi-circular in cross-section (see FIG. 6), with its cross-sectional circumference arising upwardly from the surface of the crowned profile of face 46 with a sloped "flat" ring 49 (or base) on the spherically crowned surface between each contoured ridge ring 48. Of course, each contoured ridge 48 and each intervening flat ring 49 is of increasing radius as it is formed radially outwardly from the center of the electrode face 46. By way of example, the diameter of the base of each contoured ringed ridge may be about 125 micrometers and the width of each intervening flat ring may also be about 125 micrometers.

In a preferred embodiment, the contoured rings are machined in the crowned face of the electrode. As illustrated in FIG. 2, a single piece cutter blade 50 is prepared with two cutting surfaces 52, 54 for cutting upraised concentric rings in the welding face surfaces of two electrodes 20, 28. The welding arms have positioned the welding faces of welding electrodes 20, 28 against the cutting surfaces 52, 54, respectively. This operation could be for the purpose of forming the concentric rings on new welding electrodes or for re-dressing the welding faces of used electrodes. The end 56 of the cutting surfaces 52, 54 of cutter blade 50 extends to the aligned longitudinal axes of electrodes 20, 28.

Cutter blade 50 is carried in a rotating cutting tool (not shown) that rotates the cutter blade 50 around the aligned center axes of the opposing electrodes. FIG. 3 presents an enlarged view of a portion of FIG. 2 with the lower electrode 28 removed to better illustrate the lower cutting surface 54 of cutting blade 50. The end 56 of the blade is at the center axis of the aligned electrodes. The electrodes are pressed against the cutting surfaces 52, 54 of cutting blade 50 which rotates around its end 56 to cut concentric circular ridges 48 and intervening flat rings 49 in the faces of the electrodes 20, 28.

Figure 6:
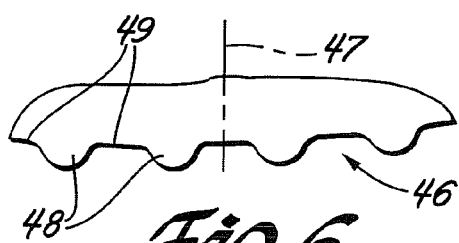
FIG. 6 is an enlarged view of a portion of the face of the welding electrode of FIG. 3 showing two of the ridge rings and an intervening "flat" area in the welding face of the electrode.

Cutting surfaces of blade 50 are curved in complementary conformance with the domed face surfaces of electrodes 20, 28 and provided with cutting surfaces for forming or re-forming the concentric contours in the electrode faces. The cutter surfaces 52, 54 may be shaped by electrical discharge machining or other suitable process to have curved circular cutter teeth 59 spaced by intervening "flat" (actually sloped) recessed cutter surfaces 58. Cutter teeth 59 and recessed cutter surfaces 58 are sized and located along cutter surfaces 52, 54 for forming the contoured faces (e.g., face 46) in electrodes 20, 28. Cutter teeth 59 are illustrated in FIG. 3 as extending straight across cutter surface 54 of cutter 50, but they may be curved for more accurate cutting of ridges 48 in electrode 20. The welding face of each electrode then has formed upstanding concentric rings of ridges of semicircular cross-section separated by concentric flat ring spaces. Two of these ridges 48 with an intervening flat ring 49, starting from the center of the crowned face of electrode 20, are illustrated in FIG. 6.

The rings of ridges 48 start at the center of the round welding face 46 and become progressively radially larger across the face. Ridges 48 are used to improve engagement of welding face 46 with the surface of a work piece to be welded. They assist in gripping the workpiece and penetrating a surface oxide layer. They improve electrical conductivity and reduce overheating and oxidation of the workpiece surface.

Electrode face ridges 48 may be formed in different continuous concentric or spaced concentric shapes such as, for example, saw tooth (triangular) or sinusoidal shapes. While the formation of the contoured surface has been illustrated by the use of a rotating cutter blade other surface shaping methods may be used.

Figure 5:
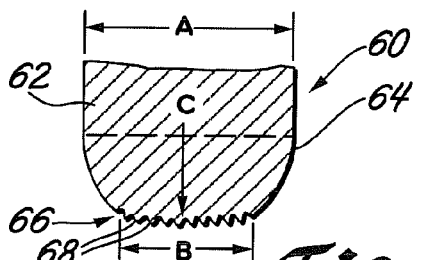
FIG. 5 is an enlarged view of an electrode with a truncated hemispherical tip portion and a crowned welding face with a machined ridge-containing surface.

FIG. 5 illustrates (in cross-section) a different electrode shape with a different face contour. Electrode 60 has a round cylindrical body 62 with a hemispherical tip 64 having the radius of the body portion 62. The hemispherical tip 64 is truncated and spherically crowned using a larger radius than the tip radius to form domed face 66 on the rounded hemispherical peripheral tip 64. By way of example, the diameter (dimension A in FIG. 5) of electrode body 60 may be about 12.5 to 22.2 mm. The planar diameter (i.e., in plan view, dimension B in FIG. 5) of the welding face 66 of electrode 60 is, for example, about 6 to 12 mm. Welding face 66 may preferably be rounded or crowned with an exemplary radius (dimension C in FIG. 4) of about 20 to 150 mm or greater. The concentric rings of ridges 68 formed in the welding face 66 are of triangular cross-sectional shape. In this example no relatively flat ring surfaces (like surfaces 49 in FIG. 6 on hemispherical face 46 of electrode 20) have been formed between the concentric, circular, radially spaced, triangular-cross section ridges 68.

The forming or dressing of the concentric rings of ridges or grooves on the welding faces (and, optionally, the tapered side surfaces of the faces) of the welding electrodes can be done following different strategies. Obviously, provision must be made in the original length of the electrode body and tip portions to accommodate repeated removal of material if the welding face of the electrode is to be repeatedly redressed. For example, in one strategy, if the grooves/ridges on the electrode can be brought into registry with the ridges/grooves on the cutting blade during dressing, then a small amount of metal can be removed to refinish the electrode without completely re-cutting the ridges/grooves. Experience in spot welding aluminum in production runs has shown that as little as 50 μm of metal can be removed to refinish the weld face. Where the size of the electrode permits a total depth of cut of 8 mm into the electrode face, which is also possible, this would result in up to 160 dresses.

Where obtaining registry between the electrode and dressing blade is not possible and new ridges/grooves need to be cut for each dressing, then the size of the ridge/groove features should be such that they can be cut without removing an excessive amount of the electrode face. In this case, to achieve a reasonable number of dresses on an electrode (>40), less than ~200 μm of metal would be removed per dress and still maintain an adequate amount of copper (~2 mm) before penetrating the water passage. This would suggest that the ridges/groove features to be machined into the electrode should have a peak-to-peak height of at most 200 μm. In general, to be effective the weld face should incorporate a minimal number of ridges/grooves, i.e., three or more. To accommodate three concentric ridges/grooves on an electrode face, for example, that is 8 mm in diameter, the maximum spacing between each feature would be about 1500 μm. For complete re-cutting of the electrode face, the grooves/ridge features would most likely have a peak-to-peak height of 20 μm to 200 μm with a spacing of 80 μm to 1500 μm, respectively.

Besides machining of grooves or ridges into the cutter face, the cutter could be designed from the outset with a textured face such as a saw tooth wave or sine wave. This would be able to produce even rougher surfaces for a given peak-to-peak height of the texture, but may be much more difficult to produce than the previous designs.

A simpler alternative to machining grooves or ridges into the cutting face of the blade would be to grind the cutting face with a rough grinding tool that puts a random set of grooves and ridges into the dressing blade. During dressing, a mirror image pattern of these features will be produced on the electrode surfaces. Since registry of the features of the blade and electrode might be more difficult to obtain in this case, the peak-to-peak height of the machined blade should be less than ~200 μm.

For blades that contain multiple cutting flutes (2 or more on a single electrode face), it may become apparent that the texturing pattern on the cutting flutes does not produce the desired pattern on the electrode face because it is not possible to perfectly align the flutes with each other and the electrode face. In this case, only one of the cutting flutes could be designed to produce the texture while the other flutes are machined so they do not contact the electrode face. Alternatively, the multiple flutes could be designed to each texture a different radial area of the electrode face leaving the remainder of the face undisturbed.

Use of welding electrodes with concentric contoured welding faces can significantly improve process robustness and weld quality for resistance spot welding of light metals. This is achieved by producing geometrically consistent, clean electrode surfaces that will be perfectly aligned on the weld gun. In addition, the surface texture produced on the welding electrodes will mechanically stabilize the welding process and significantly reduce surface expulsion, which not only harms weld quality, but detrimentally impacts paint surface quality.

In general it is preferred to form welding electrodes of copper or copper alloys because of the strength and electrical conductivity properties which are very useful in making spot welds using electrical resistance heating.

The welding electrodes have been described in terms of certain preferred embodiments but other welding face shapes may be used.

The invention claimed is:

1. A welding electrode comprising a body with a round, spherically domed weld face for contact of the spherically domed face with a workpiece in an electrical resistance welding operation, the spherically domed weld face comprising concentric circular rings of ridges that are separated by surfaces of the spherically domed weld face such that the concentric circular rings of ridges are spaced from each other radially from a center of the spherically domed weld face, the concentric circular rings of ridges being positioned to contact and impress into a workpiece surface with each of the individual ridges projecting outwardly from the surfaces of the spherically domed weld face that are adjacent thereto, the concentric circular rings of ridges having height dimensions in the range of twenty micrometers to two hundred micrometers and spacings between ridge heights in the range of eighty micrometers to fifteen hundred micrometers, and wherein the material of the concentric circular rings of ridges is susceptible to degradation in welding operations.

2. The welding electrode as recited in claim 1 in which the concentric circular rings of ridges are formed in the weld face with a cutting tool.

3. The welding electrode as recited in claim 1 in which each of the individual ridges projects outwardly, with a constant semicircular cross-sectional profile, from the surfaces of the spherically domed weld face that are adjacent thereto.

4. The welding electrode as recited in claim 1 in which the concentric circular rings of ridges have a constant triangular cross-sectional profile.

5. The welding electrode as recited in claim 1 in which the concentric circular rings of ridges have a constant sinusoidal cross-sectional profile.

6. A welding electrode for resistance spot welding a sheet metal workpiece that comprises two or more sheet metal layers, the welding electrode comprising:
a body; and
a domed weld face configured at one end of the body to contact a sheet metal workpiece surface, the weld face comprising a base surface that has a center and three or more radially-spaced circular ridges that surround the center of the base surface and project outwardly from the base surface, the three or more circular ridges being positioned on the weld face to contact and impress into the sheet metal workpiece surface during resistance spot welding, and each of the three or more circular ridges having a cross-sectional profile raised above the base surface such that each of the ridges projects outwardly from the base surface to a height between about 20 μm to 200 μm, the cross-sectional profile of each circular ridge being constant throughout a circumference of the ridge that surrounds the center of the base surface.

7. The welding electrode as recited in claim 6, wherein the three or more circular ridges include spacings between each of the circular ridges that range from about 80 μm to about 1500 μm.

8. The welding electrode as recited in claim 6, wherein the welding electrode is composed of a copper alloy.

9. The welding electrode as recited in claim 6, wherein the cross-sectional profile of each of the three or more circular ridges is semicircular.

10. The welding electrode as recited in claim 6, wherein the base surface of the welding electrode has a radius of curvature that ranges from about 20 mm to about 150 mm.

* * * * *